United States Patent
Yamaguchi et al.

(10) Patent No.: US 8,562,069 B2
(45) Date of Patent: Oct. 22, 2013

(54) FIXING STRUCTURE FOR INTERIOR BASE MATERIAL

(75) Inventors: Mamoru Yamaguchi, Toyokawa (JP); Masami Uratsu, Aichi-ken (JP); Michinori Kawasumi, Toyota (JP); Eiji Fujii, Okazaki (JP); Koji Morita, Tajimi (JP); Kenichi Uemori, Nagoya (JP); Hiroshi Harada, Nagoya (JP)

(73) Assignees: Toyota Boshoku Kabushiki Kaisha, Aichi-Ken (JP); Hayashi Telempu Co., Ltd, Aichi-Ken (JP)

( * ) Notice: Subject to any disclaimer, the term of this patent is extended or adjusted under 35 U.S.C. 154(b) by 366 days.

(21) Appl. No.: 12/767,872

(22) Filed: Apr. 27, 2010

(65) Prior Publication Data

US 2010/0269307 A1 Oct. 28, 2010

(30) Foreign Application Priority Data

Apr. 28, 2009 (JP) .................................. 2009-109781

(51) Int. Cl.
*B60J 5/00* (2006.01)

(52) U.S. Cl.
USPC ....................................... 296/191; 296/146.7

(58) Field of Classification Search
None
See application file for complete search history.

(56) References Cited

U.S. PATENT DOCUMENTS

| 1,646,906 | A | * | 10/1927 | Freund .......................... 52/800.1 |
| 5,066,066 | A | * | 11/1991 | Yurgevich et al. .......... 296/186.1 |
| 6,955,392 | B2 | | 10/2005 | Dry |
| 2003/0165664 | A1 | * | 9/2003 | Carroll et al. ................. 428/138 |
| 2005/0274452 | A1 | | 12/2005 | Schoemann et al. |
| 2010/0143074 | A1 | | 6/2010 | Sumiya et al. |
| 2010/0148014 | A1 | | 6/2010 | Yoshida |

FOREIGN PATENT DOCUMENTS

| JP | 60-6652 | 1/1985 |
| JP | 2860485 | 12/1998 |
| JP | 2604777 | 3/2000 |

OTHER PUBLICATIONS

Japan Office action, dated Apr. 2, 2013 along with an english translation thereof.

* cited by examiner

*Primary Examiner* — Jack W. Lavinder
(74) *Attorney, Agent, or Firm* — Greenblum & Bernstein, P.L.C.

(57) ABSTRACT

A fixing structure for a vehicle interior material in accordance with the present invention includes: a first interior base material including a first end portion; a second interior base material including a second end portion disposed adjacent to the first end portion; an ornamental member disposed along an axis defined by the first end portion and the second end portion; and a plurality of joints that indirectly fix the first end portion and the second end portion via the ornamental member.

6 Claims, 6 Drawing Sheets

FIXING STRUCTURE FOR INTERIOR BASE MATERIAL

CROSS REFERENCE TO RELATED APPLICATION

This application claims priority from Japanese Patent Application No. 2009-109781 filed on Apr. 28, 2009. The entire content of this priority application is incorporated herein by reference.

TECHNICAL FIELD

The present invention relates to a fixing structure for a vehicle interior material or, particularly, to a fixing structure for fixing vehicle interior base materials.

BACKGROUND

A known art discloses a fixing structure for a vehicle interior material. As illustrated in FIG. 5, the structure includes a middle board 2, an upper board 3, and a plurality of joints 4. The middle board 2 and the upper board 3 configure a door trim 1 (an illustration of the vehicle interior material). The joints 4 join an upper end portion 2U of the middle board 2 and a lower end portion 3L of the upper board 3 together. The middle board 2 and the upper board 3 are fixed together by welding these joints 4 with a welding means such as ultrasonic welding.

However, the joints 4 of the art are arranged in a single line. Then, upon side collision of the vehicle, a body panel (not shown in the figure) located outside the compartment deforms toward the inside of the vehicle compartment and pushes the door trim 1 toward the inside of the compartment. Then, the stress is concentrated in a linear portion 5 in the lower end portion 3L of the upper board 3. Thus, when the stress concentrated in the linear portion 5 has overcome the elastic limit of the portion, the door trim 1 is damaged along the linear portion 5 as illustrated in FIG. 6. This is a possible cause of decreasing the performance of an airbag that instantly inflates in the side collision.

Thus, there is a need for a structure that can prevent concentration of the stress in the narrow area along the joints of the vehicle interior materials.

SUMMARY

A fixing structure for a vehicle interior material in accordance with the present invention includes: a first interior base material including a first end portion; a second interior base material including a second end portion disposed adjacent to the first end portion; an ornamental member disposed along an axis defined by the first end portion and the second end portion; and a plurality of joints that indirectly fix the first end portion and the second end portion via the ornamental member.

With this configuration, the ornamental member is fixed to the first end portion and to the second end portion. Therefore, when the vehicle interior material is subjected to the stress from the outside of the vehicle compartment, the stress on the joints is distributed to the first end portion and to the second end portion. This makes it possible to prevent concentration of the stress on the joints. The vehicle interior material is thus protected from damage.

DETAILED DESCRIPTION

Embodiment

Figure 1:
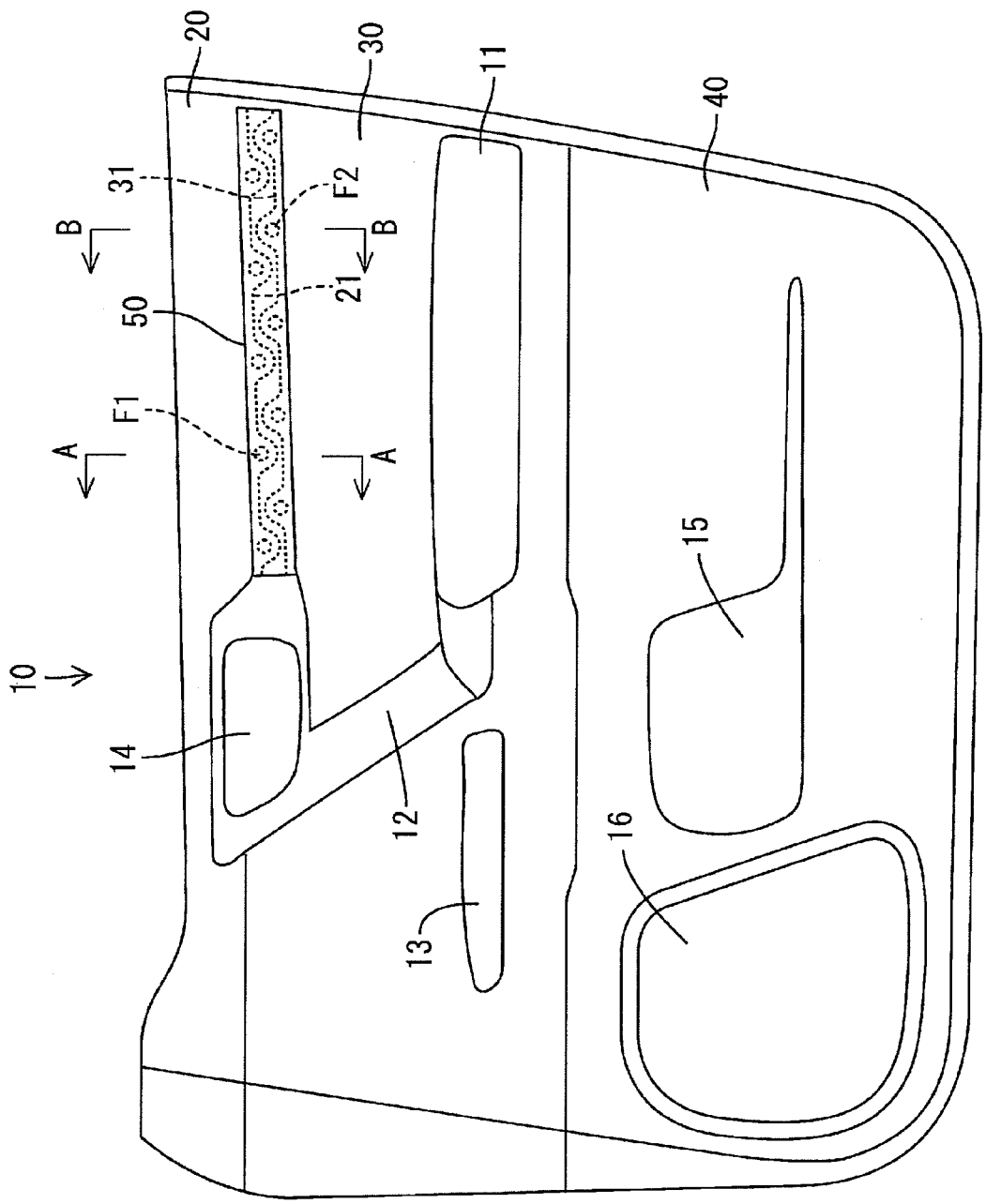
FIG. 1 is a front view of a door trim of an embodiment in accordance with the present invention.
Figure 2:
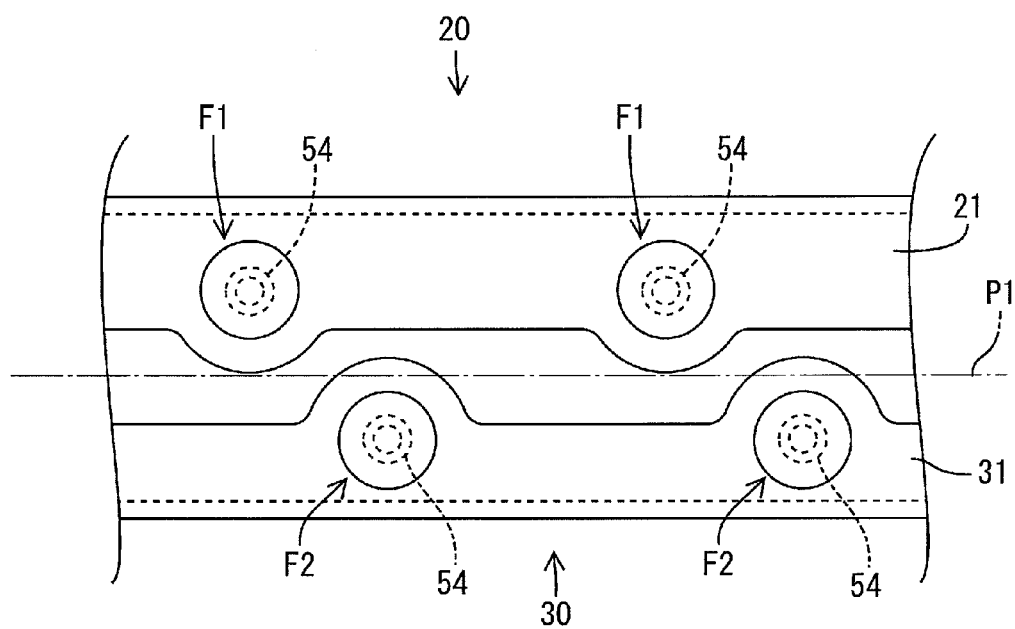
FIG. 2 is an enlarged rear view of joints.

An embodiment in accordance with the present invention will be described with reference to FIGS. 1 through 4. As illustrated in FIG. 1, a door trim 10 of this embodiment is an illustration of a vehicle interior material to be mounted to a front right door (not illustrated). The door trim 10 is disposed with the outer face thereof relative to the vehicle compartment opposed to an inner face of a door panel (not illustrated) relative to the compartment.

The door trim 10 is configured by three separate boards including an upper board 20, a middle board 30, and a lower board 40. These boards 20, 30, 40 are fixed together in a vertical arrangement to configure upper, middle, and lower parts, respectively, of the door trim 10. The boards 20, 30, 40 are made of synthetic resin such as polypropylene or mixture of wood-based material and synthetic resin. Furthermore, an inner face of the door trim 10 is partially or entirely covered with a skin 60 adhered thereto (see FIG. 3 or 4). Note that the left side in FIG. 1 is herein designated as the front.

The middle board 30 includes an armrest 11, a door grip 12, a switch base attachment portion 13, etc. When relaxing, the occupant can rest his/her elbow on the armrest 11. Upon opening and closing of the door, the occupant grips the door grip 12. The switch base attachment portion 13 accommodates a switch unit for power windows etc. The door grip 12 extends diagonally and frontward from a front end portion of the armrest 11. A handle attachment hole 14 is disposed in a distal end portion of the door grip 12. An inside handle (not illustrated) for opening and closing the door can be attached in the handle attachment hole 14. The handle attachment hole 14 is disposed in a border between the upper board 20 and the middle board 30. Note that the switch base attachment portion 13 is disposed below the door grip 12. The lower board 40 includes a door pocket 15, a speaker hole 16, etc. The occupant can put small items in the door pocket 15. A speaker (not illustrated) can be mounted in the speaker hole 16.

A woodgrain ornament 50 (an illustration of an "ornamental member") is disposed on the door trim 10 or, more specifically, in the rear of the handle attachment hole 14. The woodgrain ornament 50 extends in a back-and-forth direction of the vehicle. A function of the woodgrain ornament 50 is to, as generally known, improve the appearance of the door trim 10. In addition to this, the woodgrain ornament 50 of this embodiment functions also as a fixing member to fix the upper board 20 to the middle board 30. That is, the upper board 20 and the middle board 30 are indirectly fixed with the ornament 50 interposed therebetween in the rear of the handle attachment hole 14.

Figure 3:
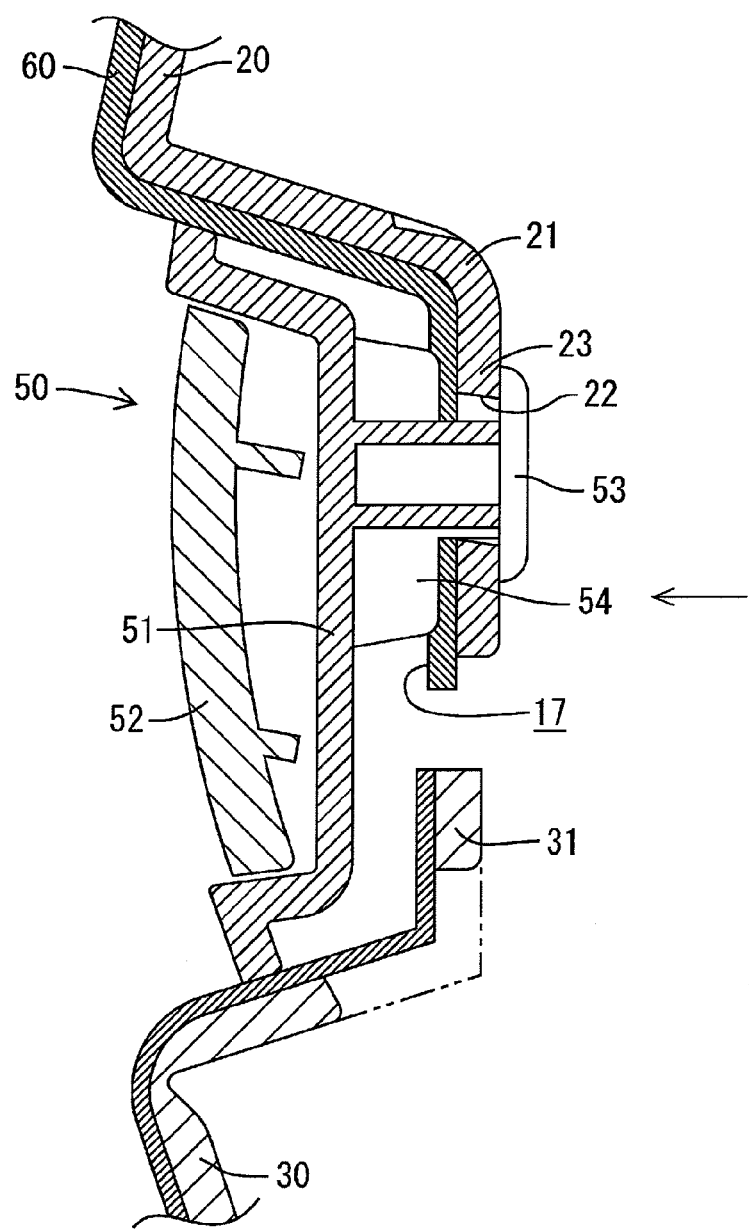
FIG. 3 is a sectional view along line A-A in FIG. 1.
Figure 4:
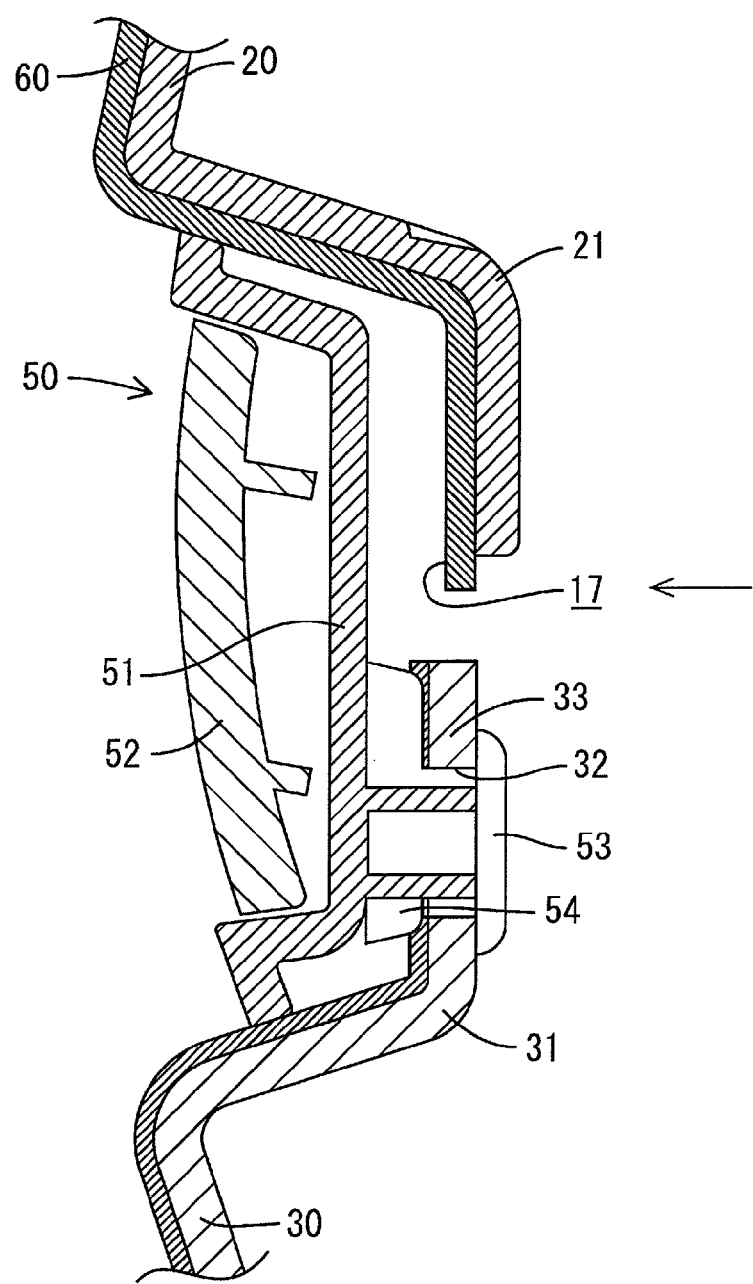
FIG. 4 is a sectional view along line B-B in FIG. 1.
Figure 5:
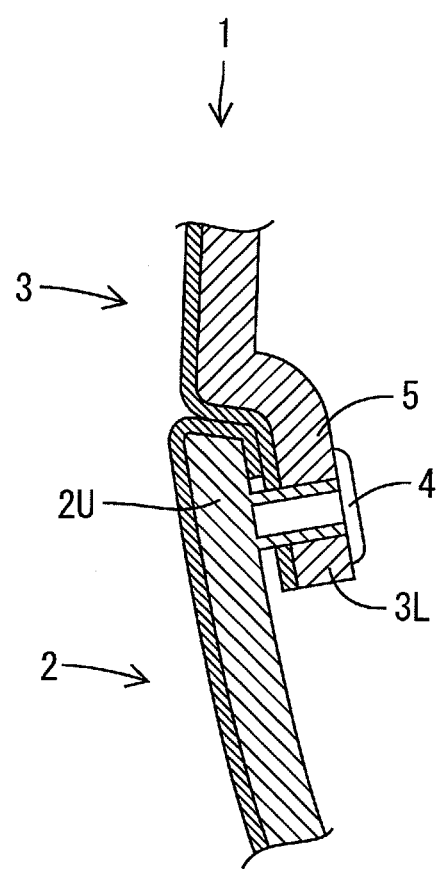
FIG. 5 is a sectional view of a fixing structure between a middle board and an upper board of a conventional art.
Figure 6:
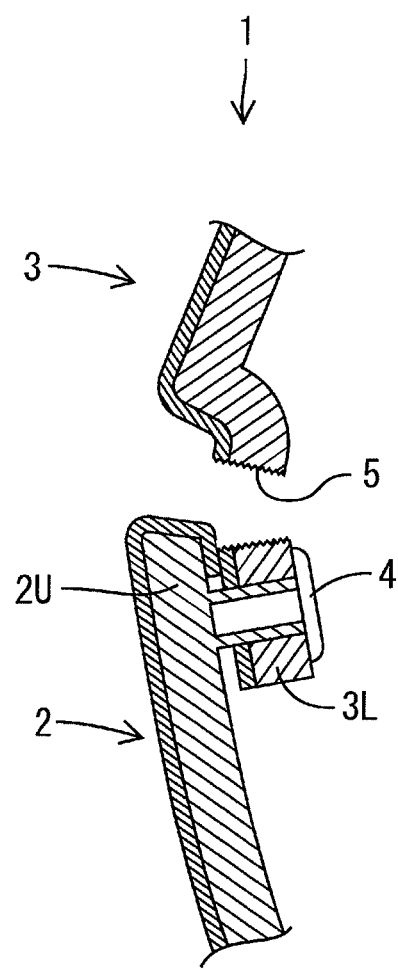
FIG. 6 is a sectional view illustrating a state where the door trim illustrated in FIG. 6 is damaged due to concentrated stress.

The details of the woodgrain ornament 50 are illustrated in FIGS. 3 and 4. Namely, the woodgrain ornament 50 includes a base 51 and a decorative member 52. The base 51 is secured to the upper board 20 and to the middle board 30. The decorative member 52 has a woodgrain decorative surface. The base 51 and the decorative member 52 are assembled with a screw into a unit of the woodgrain ornament 50.

As illustrated in FIGS. 3 and 4, the base 51 has attachment bosses 53. The attachment bosses 53 protrude from a back face (a face opposite from the decorative face) of the base 51. Attachment supports 54 are arranged around the basal end portions of the attachment bosses 53. On the other hand, the door trim 10 has an accommodation concavity 17. The accommodation concavity 17 can accommodate the woodgrain ornament 50. A lower end portion 21 of the upper board 20 and an upper end portion 31 of the middle board 30 are arranged adjacent to each other and configure the accommodation concavity 17.

An airbag (not illustrated) is disposed in, for example, a side of the front sheet in the compartment. The lower end portion 21 of the upper board 20 has a face that is oriented against the inflating direction of the airbag. Therefore, even upon side collision when the body panel deforms toward the inside of the compartment and pushes the door trim 10 toward the inside of the compartment, the face of the lower end portion 21 of the upper board 20 blocks off the passage of the instantly inflating airbag into a space caused between the woodgrain ornament 50 and the lower end portion 21 of the upper board 20. The loss in the airbag deployment performance is thus less.

As illustrated in FIG. 3, insertion holes 22 are arranged each through the thickness of the lower end portion 21 of the upper board 20. The insertion holes 22 allow for insertion of the attachment bosses 53 thereinto. Each attachment boss 53 is inserted in the corresponding insertion hole 22. A hole edge portion 23 of the insertion hole 22 is supported by the attachment support 54. The head of the attachment boss 53 is welded by a welding means such as ultrasonic welding. The base 51 is thus fixed to the upper board 20. Note that the attachment boss 53, the attachment support 54, the insertion hole 22, and the hole edge portion 23 are examples of attachment portions and configure a first joint F1 (an illustration of a "first joint").

As illustrated in FIG. 4, insertion holes 32 are arranged each through the thickness of the upper end portion 31 of the middle board 30. The insertion holes 32 allow for insertion of the attachment bosses 53 thereinto. Each attachment boss 53 is inserted in the corresponding insertion hole 32. A hole edge portion 33 of the insertion hole 32 is supported by the attachment support 54. The head of the attachment boss 53 is welded by a welding means such as ultrasonic welding. The base 51 is thus fixed to the middle board 30. Note that the attachment boss 53, the attachment support 54, the insertion hole 32, and the hole edge portion 33 are examples of attachment portions and configure a second joint F2 (an illustration of a "second joint").

As illustrated in FIGS. 3 and 4, the first joints F1 and the second joints F2 configured as described above are arranged alternately in the back-and-forth direction of the vehicle. Furthermore, the first joints F1 and the second joints F2 are disposed in a staggered arrangement. In other words, assuming an axis P1 extending in the middle between the lower end portion 21 of the upper board 20 and the upper end portion 31 of the middle board 30 and in the back-and-forth direction of the vehicle, the first joints F1 are disposed in an area above the axis P1, while the second joints F2 are disposed in an area below the axis P1.

Thus, upon side collision of the vehicle when the body panel deforms toward the inside of the compartment and pushes the door trim 10 toward the inside of the compartment, the woodgrain ornament 50 is subjected to the stress in the direction illustrated by arrow in FIGS. 3 and 4. Then, the stress is distributed to the first joints F1 and to the second joints F2, so that concentration of stress in a narrow area can be avoided. This makes it possible to protect the first joints F2 and the second joints F2 from damage. Furthermore, the deployment of the airbag can be less influenced.

The above is an illustrative configuration of the present embodiment. The operation of the present embodiment will hereinafter be described. Upon side collision when the woodgrain ornament 50 is subjected to the stress in the direction indicated by arrow in FIGS. 3 and 4 from the outside of the compartment, the stress is transferred to the upper board 20 and to the middle board 30 via the first joints F1 and via the second joints F2, respectively. Note here that the separate joints F1, F2 are provided in the upper board 20 and the middle board 30, respectively, and the first joints F1 and the second joints F2 are disposed in the staggered arrangement. Accordingly, the stress is distributed to the upper board and to the middle board 30. Thus, concentration of the stress in the narrow area can be avoided. Furthermore, even upon side collision when the body panel deforms toward the inside of the compartment and pushes the door trim 10 toward the inside of the compartment, the face of the lower end portion 21 of the upper board 20 blocks off the passage of the instantly inflating airbag into a space caused between the woodgrain ornament 50 and the lower end portion 21 of the upper board 20. The loss in the airbag deployment performance is thus less.

As described above, when the woodgrain ornament 50 is subjected to the stress from the outside of the compartment, the configuration of this embodiment makes it possible to distribute the stress to the first joints F1 and to the second joints F2. Furthermore, the joints F1 and the joints F2 are provided in the upper board 20 and in the middle board 30, respectively, so that concentration of the stress can be avoided. This makes it possible to protect the door trim 10 from damage. Furthermore, the first joints F1 and the second joints F2 are arranged alternately in the back-and-forth direction of the vehicle and in the staggered arrangement. This makes it possible to distribute the stress on the woodgrain ornament 50 in a desired balance to the upper board 20 and to the middle board 30.

Other Embodiments

The present invention is not limited to the embodiment described above with reference to the drawings. For example, following embodiments are also included within the scope of the present invention.

(1) In the above-described embodiment, the present invention is illustratively adopted to the fixing structure between the lower end portion 21 of the upper board 20 and the upper end portion 31 of the middle board 30. The present invention can also be adopted to a fixing structure between a lower end portion of the middle board 30 and an upper end portion of the lower board 40.

(2) In the above-described embodiment, the woodgrain ornament 50 illustratively extends in the back-and-forth direction of the vehicle. In accordance with the present invention, the woodgrain ornament 50 may extend in a vertical direction. In this case, the woodgrain ornament 50 will be disposed between a front board and a rear board that are arranged in a row in the back-and-forth direction of the vehicle.

(3) In the above-described embodiment, ultrasonic welding is adopted as a welding means for the first joints F1 and the second joints F2. In accordance with the present invention, various fixing means such as screwing and claw coupling may be adopted.

(4) In the above-described embodiment, the first joints F1 and the second joints F2 are arranged alternately in the back-and-forth direction of the vehicle. In accordance with the present invention, groups of a plurality of the first joints F1 and groups of a plurality of the second joints F2 may be alternately arranged.

(5) In the above-described embodiment, the first joints F1 and the second joints F2 are disposed in the respective areas that are opposite relative to the axis P1. In accordance with the present invention, the first joints F1 and the second joints F2 may be arranged in a single straight line on the axis P1.

What is claimed is:

1. A fixing structure for a vehicle interior material of a vehicle, the fixing structure comprising:
    a first interior base including a first end portion having attachment portions;
    a second interior base including a second end portion disposed adjacent to the first end portion and having attachment portions, the second interior base being spaced from the first interior base; and
    an ornamental member including first attachment portions and second attachment portions on a back surface of the ornamental member, the ornamental member being disposed over a part of the first interior base and a part of the second interior base along a longitudinal axis that extends between the first end portion and the second end portion in a front-rear direction of the vehicle, the first attachment portions and the second attachment portions of the ornamental member being fixed to the attachment portions of the first interior base and the attachment portions of the second interior base, respectively, wherein
    the attachment portions of the first interior base and the second interior base are a plurality of insertion holes and a plurality of hole edge portions,
    the first and second attachment portions of the ornamental member are a plurality of attachment bosses and a plurality of attachment supports,
    the attachment portions of the first interior base and the attachment portions of the second interior base are positioned in an alternating manner along opposite sides of the longitudinal axis, respectively, and
    the first attachment portions and the second attachment portions of the ornamental member are arranged in an alternating manner at positions corresponding to the respective attachment portions of the first interior base and the respective attachment portions of the second interior base along the longitudinal axis.

2. The fixing structure according to claim 1, wherein the longitudinal axis extends along a substantial middle between the first end portion and the second end portion.

3. The fixing structure according to claim 1, wherein
    at least one attachment portion of the attachment portions of the second interior base is provided between adjacent attachment portions of the first interior base extending along the longitudinal axis,
    at least one attachment portion of the attachment portions of the first interior base is provided between adjacent attachment portions of the second interior base extending along the longitudinal axis,
    at least one second attachment portion of the second attachment portions of the ornamental member is provided between adjacent first attachment portions of the ornamental member extending along the longitudinal axis, and
    at least one first attachment portion of the first attachment portions of the ornamental member is provided between adjacent second attachment portions of the ornamental member extending along the longitudinal axis.

4. The fixing structure according to claim 1, wherein
    one insertion hole of the second interior base is provided between adjacent insertion holes of the first interior base extending along the longitudinal axis,
    one insertion hole of the first interior base is provided between adjacent insertion holes of the second interior base extending along the longitudinal axis,
    one attachment boss of the second attachment portions of the ornamental member is provided between adjacent attachment bosses of the first attachment portions of the ornamental member extending along the longitudinal axis, and
    one attachment boss of the first attachment portions of the ornamental member is provided between adjacent attachment bosses of the second attachment portions of the ornamental member extending along the longitudinal axis.

5. The fixing structure according to claim 1, wherein
    the attachment portions of the first interior base and the attachment portions of the second interior base are provided in a staggered arrangement, and
    the first attachment portions and the second attachment portions of the ornamental member are provided in a staggered arrangement.

6. The fixing structure according to claim 1, wherein the longitudinal axis extends in a front-rear direction of the vehicle.

* * * * *